United States Patent
Zhang et al.

(10) Patent No.: US 8,382,861 B2
(45) Date of Patent: Feb. 26, 2013

(54) METHOD OF PRODUCING A GEL POLYMER LI-ION BATTERY

(75) Inventors: Xin Zhang, Xiamen (CN); Haitao Xu, Beijing (CN); Yanchuan Guo, Beijing (CN); Qiangli Gao, Dalian (CN); Rongfu Li, Xiamen (CN); Ying Cui, Xiamen (CN); Yuanfen Hu, Guandong Province (CN); Keli Chen, Yunna Province (CN)

(73) Assignee: Xin Zhang, Xiamen (CN)

( * ) Notice: Subject to any disclaimer, the term of this patent is extended or adjusted under 35 U.S.C. 154(b) by 387 days.

(21) Appl. No.: 12/720,272

(22) Filed: Mar. 9, 2010

(65) Prior Publication Data

US 2010/0304220 A1    Dec. 2, 2010

(30) Foreign Application Priority Data

May 26, 2009    (CN) .......................... 2009 1 0143466

(51) Int. Cl.
*H01M 4/82* (2006.01)
*H01M 6/00* (2006.01)
*H01M 6/14* (2006.01)
*H01M 4/02* (2006.01)

(52) U.S. Cl. .................. 29/623.5; 429/300; 429/211

(58) Field of Classification Search .............. 429/300, 429/303, 211; 29/623.5
See application file for complete search history.

(56) References Cited

U.S. PATENT DOCUMENTS

| 2003/0003368 A1 | 1/2003 | Lee et al. |
| 2003/0157411 A1 | 8/2003 | Jung et al. |
| 2011/0171371 A1* | 7/2011 | Li et al. .................. 427/122 |

FOREIGN PATENT DOCUMENTS

| CN | 1787271 A | 6/2006 |
| CN | 1297033 C | 1/2007 |
| CN | 1302069 C | 2/2007 |
| CN | 1320686 C | 6/2007 |
| WO | WO 97/27636 A1 | 7/1997 |
| WO | WO 01/35482 A1 | 5/2001 |
| WO | WO-03/019698 A2 | 3/2003 |

* cited by examiner

*Primary Examiner* — Carlos Barcena
(74) *Attorney, Agent, or Firm* — Birch, Stewart, Kolasch & Birch, LLP

(57) ABSTRACT

The invention relates to a composite gel polymer Li-ion battery and its producing method. The Li-ion battery cell includes a three-layer composite layer of positive electrode current collector, positive electrode active material and gel polymer electrolyte obtained by a two-layer one-step coating process; a two-layer composite layer of negative electrode current collector and negative electrode active material obtained by a single-layer coating process or a negative electrode two-layer composite layer coated with a little polyurethane adhesive(s) on the surface. The gel polymer Li-ion battery cell is obtained by laminating the resultant two composite layers. The gel polymer Li-ion battery cell has a small thickness and a compact structure, and is laminated closely and easy for preparation and industrial automatic production. The Li battery prepared by the method has a uniform structure, a low internal resistance, a high uniformity, a good unity, and a high safety.

14 Claims, 2 Drawing Sheets

METHOD OF PRODUCING A GEL POLYMER LI-ION BATTERY

TECHNICAL FIELD

The present invention relates to a structure of a gel polymer Li-ion battery and producing method thereof, in particular relates to a method of preparing a polyurethane gel electrolyte and a method of preparing a Li battery electrode by a single- or two-layer one-step coating process.

BACKGROUND ART

The production of Li-ion batteries began from 1960s to 1970s. Since the metal Li has a light weight, a low oxidation-reduction potential, and a big quality energy density, it becomes the most advantageous alternative new energy source. The industrial development and research of the Li batteries began in 1997 in China, and up to date, the Li battery products are produced at different quality levels, with great differences among the high, middle and low quality levels. Due to consumers' demand and intensified enforcement of the national standards, it is desirable for a high-capacity, superior Li battery which is safe and reliable. Polymer Li batteries originates in 1994, and the electrolyte thereof utilizes polymers and has some advantages of stronger plasticity, burning resistance, a higher use ratio of volume and a longer service life. At present, polymer Li batteries can be produced in China, most of which, however, are improved liquid Li-ion batteries, and thus are obviously different from gel-type Li-ion batteries as produced abroad. The Li-ion batteries made in China are only quasi-gel-type polymer Li-ion batteries and some can be regarded as a soft-packing of liquid Li-ion battery, and therefore, technologies about novel polymer Li-ion batteries and the extensive applications thereof are highly demanded.

Polymer Li-ion batteries can be divided into high-capacity batteries and compact batteries. High-capacity batteries are mainly used in large machines such as electric automobiles, aeronautic and astronautic devices, combined regulation of electric networks, and so on. Compact batteries are used in common electronic components, such as mobile phones, laptops, video cameras, and so on. Among commercial rechargeable batteries, polymer Li-ion batteries have the highest specific energy, and can be produced as a thin battery so as to meet consumers' needs for light-weight, thin and short portable electronics.

According to the existing preparation methods, aluminum-plastic films are used in most cases for packing, wherein liquid electrolytic solutions are contained. Problems such as swelling, leakage and burning, even explosion are likely to occur due to a low mechanical strength, thereby affecting seriously the safety of the batteries, which leads to ending service life.

At present, all common polymer Li-ion batteries have a three-layer-sandwiched construction. For example, a variable polymer Li battery pack has been prepared by laminating battery cells as disclosed in Chinese Patent Application No. 200410077201, filed by YINGSAIER TECH (SHENZHEN) COMPANY LTD., Chinese Patent No. 200410052454.X, owned by HUIZHOU TCL JINNENG BATTERY COMPANY LTD., and Philips Electronics' International Publication No. WO2003/019698. XINNENG HIGH TECH COMPANY LTD prepares a colloidal electrolytic solution by initiating polymerization using polypropylene as monomers, then the solution is introduced into an aluminum foil bag containing battery cells, but the distribution of gel electrolyte in the battery cells isn't described. Samsung SDI CO. LTD.'s patents (CNO3103890.5, CNO2121519.7) describe a method of preparing a solid polymer electrolyte by using acrylate ester and ethylene oxide as monomers, in which the electrolyte is an organic electrolytic solution comprising Li salts, instead of those existing liquid electrolytes in preparing Li battery.

SUMMARY OF THE INVENTION

The first objective of the present invention is to provide a gel polymer Li-ion battery. Another objective of the invention is to provide a method of producing the gel polymer Li-ion battery, which includes a process of preparing a gel polymer electrolyte, and a two-layer one-step coating forming technique process of coating a polyester film coated with metal foil with the gel polymer electrolyte and a positive electrode material. This technique process has a high production precision, and can guarantee the uniformities of electrode materials and battery cells, simplify the operational procedures and improve production efficiency.

In one aspect, the present invention provides a gel polymer Li-ion battery, which comprises a single Li-ion battery cell or a plurality of vertically-laminated Li-ion battery cells. The Li-ion battery cell includes: a polyester/metal foil composite film coated with layers of positive electrode active material and gel polymer electrolyte, and a polyester/metal foil composite film coated with a negative electrode active material. The polyester/metal foil composite film coated with the negative electrode active material may be further coated with a polyurethane adhesive on a surface of the negative electrode active material thereof. The polyester is one selected from polyethylene glycol terephthalate, polymethyl methacrylate, polymethyl acrylate, 4,4'-diphenylmethane diisocyanate, or the mixtures thereof. The thickness of the film is 1-100 μm. The metal foil has a nonporous, porous or net structure. The thickness of the metal foil is 5-20 μm. The metal foil is one selected from aluminum foil, copper foil, silver foil, and gold foil, or a composite metal foil consisted of two or more of these metal foils.

In another aspect, the invention provides a method of preparing the gel polymer Li-ion battery, which includes the following steps:

a) coating a surface of a polyester film with a polyurethane adhesive, roller- or flat-pressing a metal foil and the pre-coated polyester film, thereby obtaining a polyester composite film covered with the metal foil;

b) coating the polyester composite film covered with the metal foil with two kinds of slurries of a positive electrode active material and a gel polymer electrolyte by using a two-layer one-step coating process, thereby obtaining a three-layer structural composite layer of the polyester/metal foil composite film, the positive electrode active material and the gel polymer electrolyte;

c) coating a composite film covered with a metal foil with a Li battery negative electrode material slurry, thereby obtaining a two-layer structural composite layer of the polyester/metal composite film and the negative electrode material;

d) laminating, and flat- or roller-pressing the composite layers obtained in the steps b) and c), heating and curing, thereby obtaining a gel polymer gel Li-ion battery cell;

e) welding the metal foils of positive electrode and negative electrode with metal lugs; and f) vacuum-packing the battery cells, thereby obtaining the gel polymer Li-ion battery.

Wherein, the gel polymer electrolyte in step b) may consist of a polymeric monomer(s), an aldehydic curing agent(s) and a gel polymer electrolytic solution. The gel polymer electrolyte may consist of 3-20% (w/w) of the polyurethane monomer(s), 0.1-5% (w/w) of the aldehydic curing agent(s) and a conventional gel polymer electrolytic solution. The gel polymer electrolytic solution is used in an amount of 75%-96.9% of the total mass of the gel polymer electrolyte. The polymeric monomer(s) can be selected from polyurethane monomers. The aldehydic curing agent(s) can be selected from a formaldehyde curing agent. The composition of the gel electrolytic solution can be the following: the solvent thereof is one selected from EC, PC, DMC, EMC and DME, or the mixture thereof, the solute thereof is one or two selected from $LiPF_6$ and $LiClO_4$, the curing temperature of the gel polymer electrolyte is 20-100° C., and the curing duration is 10-240 minutes. The negative electrode material slurry in step c) may comprise a polyurethane adhesive(s), and further comprises one or more selected from mesocarbon spheres, nanographite, carbon nanotubes and pyrolytic carbon spheres. The particle sizes of the nanographite, carbon nanotubes and pyrolytic carbon spheres may be 50-800 nm. Groups of battery cells may be laminated horizontally, thereby obtaining a gel polymer Li-ion battery pack comprising the plural groups of the gel polymer Li-ion battery cells. When each group of gel polymer Li-ion battery cell for the lamination has the same geometrical shape, the deviations of the surface area, internal resistance and capacity among the groups are less than 3%. The thickness of the three-layer structural composite layer may be 15-300 μm. The thickness of the two-layer structural composite layer in the step c) may be 8-300 μm. The leading-out direction of the lugs in the step e) may be horizontally at the same side or both sides of the cell coating.

According to the present invention, the polyurethane gel electrolyte is used for replacing original liquid electrolytes, and thus the safety of the Li batteries is improved thoroughly, the service performance at high and low temperatures of and charge-discharge rate of the Li batteries have been enhanced. And the preparation method of the Li batteries has been further simplified. The application of the two-layer one-step coating process leads to directly a composite coating comprising the electrode material and the gel polymer electrolyte, so that the products can have higher uniformity and be easier for industrial production, and the productivity can be improved greatly. The preparation method of the battery cell according to the present invention employs an automatic controllable coating process, which greatly simplifies the production process of battery electrode. And the differences among the products due to manual uncontrollable factors can be eliminated, so that those obtained electrode materials cells can have a high uniformity, and can eliminate unsafe factors of charge-discharge due to non-uniformity of the battery cells. According to the present invention, rate of finished products is improved, costs of materials, manufacturing and tests are reduced, and production efficiency is improved simultaneously.

The polymer electrolyte prepared by using the polyurethane monomer and aldehydic curing agents according to the present invention has never been reported in patents and references as found. Therefore, it possesses original creativity. The method of preparing a composite coating comprising an electrode active materials and a gel polymer electrolyte in one step by a two-layer one-step coating process is a new method of preparing Li battery electrodes. The new method can greatly improve the uniformity and productivity of electrode cells. And the finished product rate of cells prepared according to the method is 90% or more.

A series of these simplified concepts are introduced into the Summary of the Invention which will be specified further in the Best Modes For Carrying Out The Invention. The Summary of the Invention in the present invention does not mean attempting to define the critical features and essential technical features of the claimed technical solutions, nor mean attempting to define the protection scope of the claimed technical solutions.

BRIEF DESCRIPTION OF THE DRAWINGS

The following figures of the present invention, as part of the invention, are used for understanding and interpreting the invention.

BEST MODES FOR CARRYING OUT THE INVENTION

Figure 1:
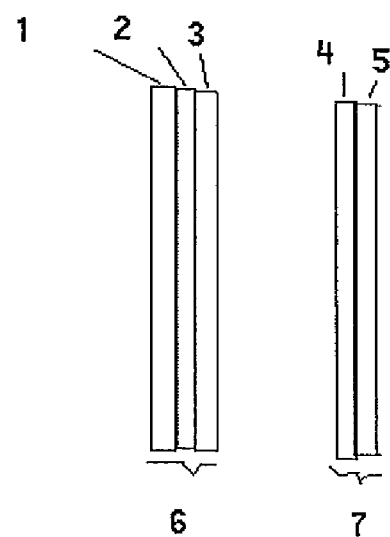
FIG. 1 is schematic diagrams of the three-layer composite and the two-layer composite, wherein the reference number 1 designates a polyester film covered by a metal foil, 2 designates a positive electrode active material, 3 designates a gel polymer electrolyte, 4 designates a negative electrode active material, 5 designates a polyester film covered by a metal foil, 6 designates the three-layer composite, and 7 designates the two-layer composite.
Figure 2:
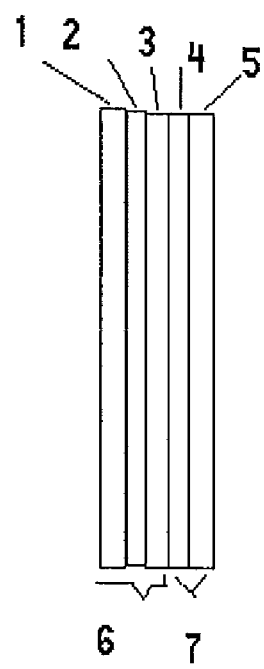
FIG. 2 is a diagram showing a combination of the three-layer composite of polyester/aluminum, positive electrode active material and gel polymer electrolyte with the two-layer composite of polyester/aluminum and negative electrode active material, the composite being roller-pressed into a polymer Li battery cell, wherein 8 designates the combination.
Figure 3:
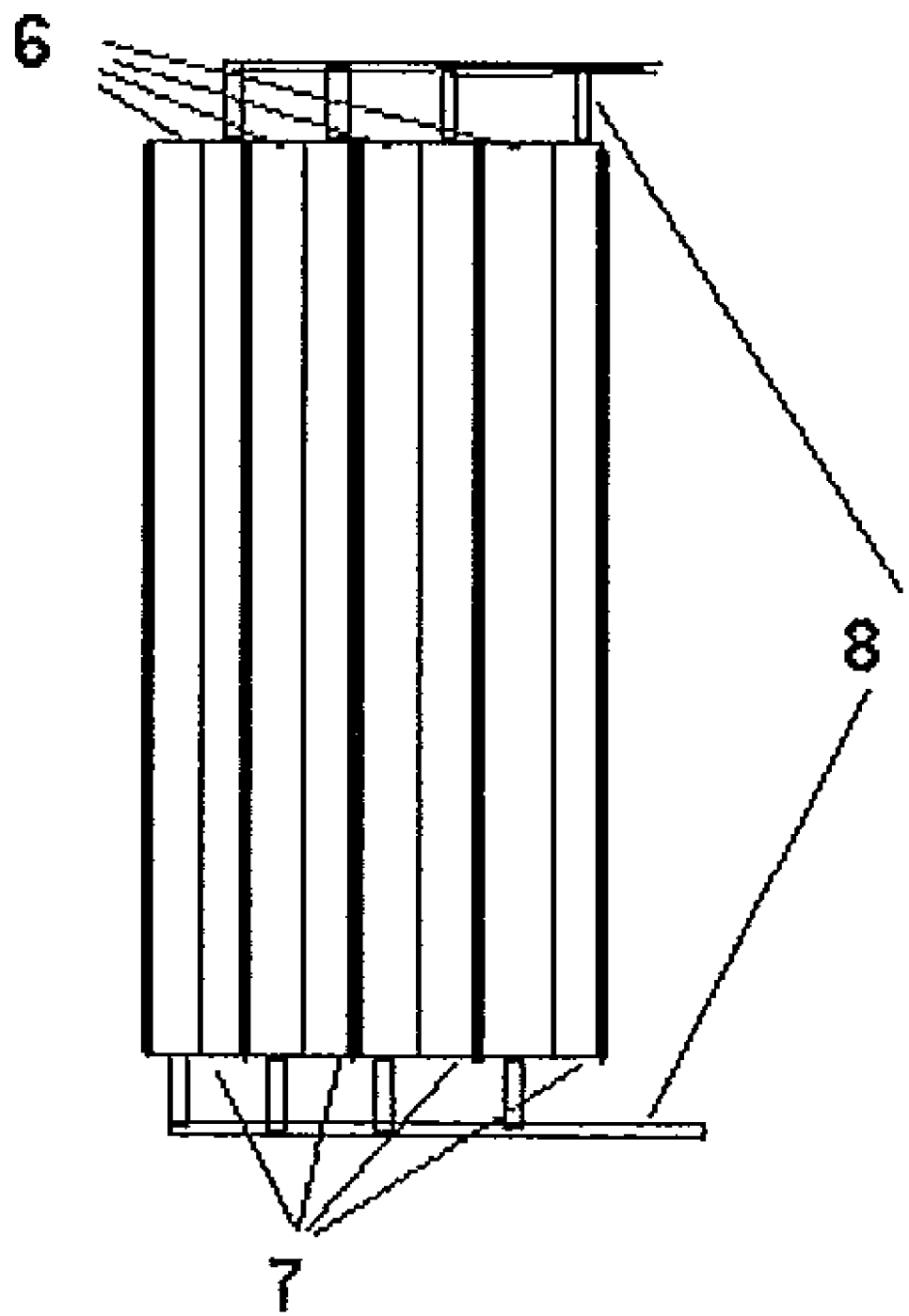
FIG. 3 is a diagram showing a lamination of three polymer Li battery cells.

In the following description, a number of details are given for understanding the invention more completely. However, it is obvious for those skilled in the art that the invention can be carried out without one or more of such details. In order to avoid confusing the invention, some technical features, which are common knowledge in the art, are not illustrated in other examples.

EXAMPLES

Example 1

Preparation of Composite Coating of Positive Electrode Active Material and Gel Electrolyte Eighty-five (85) parts by weight of lithium cobaltate, 10 parts by weight of graphite powders and 5 parts by weight of a polyurethane monomer are dispersed into N-methyl pyrrolidone (hereinafter referred to as "NMP") to prepare a positive electrode active material slurry; a polyurethane monomer is dissolved in a solution of tetrahydrofuran:acetone as 1:1, thereby obtaining a solution of a concentration of 3% by mass, into which a formaldehyde curing agent of a concentration of 0.1% is then added. A $LiPF_6$ solution of a concentration of 1 M, in an amount of 75% (w/w) of the polyurethane, using EC/DMC/EMC (1:1:1) as a solvent is added therein. An extrusion-type two-layer one-step coater is used to uniformly coat the above-mentioned two slurries onto a surface of a polyester film covered by metal foil, and the thickness of the coating is controlled to 15 μm. The coated composite film is passed through a drying channel, and is maintained therein for 10 minutes at 20° C. to cure and dry the gel electrolyte. The resultant product is continuously rolled up to obtain a composite coating of the positive electrode active material and the gel electrolyte.

Preparation of Negative Electrode

Ninety-five (95) parts by weight of mesocarbon spheres and 5 parts by weight of polyurethane are dispersed into NMP to prepare a negative electrode active material slurry. A coater is used to coat the negative electrode active material slurry onto a polyester film covered by metal foil to obtain a two-layer composite film, and the thickness of the two-layer composite film is 8 μm. The coating is then placed in a drying channel, and is maintained therein for 10 minutes at 20° C. to cure and dry the negative electrode material. The resultant product is continuously rolled up to obtain a negative electrode material.

Preparation of Battery

The composite coating of positive electrode active material and gel electrolyte and the negative electrode material are cut into a predetermined size, and then the two layers are laminated. The lamination is pressed at 60° C. to obtain a preformed polymer Li-ion battery cell. A plurality of the cells is laminated in parallel, leading out positive electrode and negative electrode lugs from each cell. The resultant product is vacuum-packed to constitute a composite polymer Li-ion battery pack.

Example 2

Preparation of Composite Coating of Positive Electrode Active Material and Gel Electrolyte Eighty-five (85) parts by weight of lithium cobaltate, 10 parts by weight of graphite powders and 5 parts by weight of polyurethane are dispersed into N-methyl pyrrolidone (hereinafter referred to as "NMP"), thereby preparing a positive electrode active material slurry; a polyurethane monomer is dissolved in a solution of tetrahydrofuran:ethyl acetate:acetone as 1:1:1, thereby obtaining a solution of a concentration of 20% by mass, into which a formaldehyde curing agent of a concentration of 5% is then added. A $LiClO_4$ electrolytic solution of a concentration of 1 M, in an amount of 96% (w/w) of the polyurethane, using EC:PC=1:1 as a solvent is added therein. An extrusion-type two-layer one-step coater is used to coat the above-mentioned two solutions uniformly on a surface of a polyester film covered by metal foil, and the thickness of the three-layer composite film is controlled to 300 μm. The coated composite film is passed through a drying channel, and is maintained therein for 240 minutes at 100° C. to cure and dry the gel electrolyte. The resultant product is continuously rolled up to obtain a composite coating of the positive electrode active material and the gel electrolyte.

Preparation of Negative Electrode

Ninety-five (95) parts by weight of mesocarbon spheres and 5 parts by weight of polyurethane are dispersed into NMP, thereby preparing a negative electrode active material slurry. A coater is used to coat the negative electrode active material slurry onto a polyester film covered by metal foil to obtain a two-layer composite film, and the thickness of the two-layer composite film is 300 μm. The coating is then placed in a drying channel, and is maintained therein for 10 minutes at 20° C. to cure and dry the negative electrode material. The resultant product is continuously rolled up to obtain a negative electrode material.

Preparation of Battery

The composite coating of positive electrode active material and gel electrolyte and the negative electrode material are cut into a predetermined size, and then the two layers are laminated. The lamination is pressed at 60° C. to obtain a preformed polymer Li-ion battery cell. A plurality of the cells is laminated in parallel, leading out positive electrode and negative electrode lugs from each cell. The resultant product is vacuum-packed to constitute a composite polymer Li-ion battery pack.

Example 3

Preparation of Composite Coating of Positive Electrode Active Material and Gel Electrolyte Eighty-five (85) parts by weight of lithium cobaltate, 10 parts by weight of graphite powders and 5 parts by weight of polyurethane are dispersed into N-methyl pyrrolidone (hereinafter referred to as "NMP"), thereby preparing a positive electrode active material slurry; a polyurethane monomer is dissolved in a solution of tetrahydrofuran:ethyl acetate:acetone as 1:1:1, thereby obtaining a solution of a concentration of 10% by mass, into which a formaldehyde curing agent of a concentration of 2.5% is then added. A $LiPF_6$ electrolytic solution of a concentration of 1 M, in an amount of 85% (w/w) of the polyurethane, using EC:DMC=1:1 as a solvent is then added. An extrusion-type two-layer one-step coater is used to coat the above-mentioned two solutions uniformly on a surface of a polyester film covered by metal foil, and the thickness of the three-layer composite film is controlled to 150 μm. The coated composite film is passed through a drying channel, and is maintained therein for 120 minutes at 60° C. to cure and dry the gel electrolyte. The resultant product is continuously rolled up to obtain a composite coating of the positive electrode active material and the gel electrolyte.

Preparation of Negative Electrode

Ninety-five (95) parts by weight of mesocarbon spheres and 5 parts by weight of polyurethane are dispersed into NMP, thereby preparing a negative electrode active material slurry. A coater is used to coat the negative electrode active material slurry onto a polyester film covered by metal foil to obtain a two-layer composite film, and the thickness of the two-layer composite film is 60 μm. The coating is placed in a drying channel, and maintained therein for 120 minutes at 60° C. to cure and dry the negative electrode material. The resultant product is continuously rolled up to obtain a negative electrode material.

Preparation of Battery

The composite coating of positive electrode active material and gel electrolyte and the negative electrode material are cut to a predetermined size, and then the two layers are laminated. The lamination is pressed at 60° C. to obtain a preformed polymer Li-ion battery cell. Ten layers of the cells are laminated in parallel, leading out positive electrode and negative electrode lugs from each cell. The resultant product is vacuum-packed to constitute a composite polymer Li-ion battery pack.

While the present invention has been illustrated by the above examples, it should be understood that the examples are only provided for the purpose of illustration and description, and it is not intended to limit the invention to the scope of the examples. In addition, it is to be understood by practitioners skilled in the art that the invention is not limited to the above examples, that more modifications and variations can be made according to the teaching of the invention, and that such modifications and changes also fall within the protection scope which the invention claims. The protection scope of the invention is defined by the attached claims and their equivalents.

The invention claimed is:

1. A method of preparing a gel polymer Li-ion battery, characterized in that the Li-ion battery comprises a single Li-ion battery cell or a plurality of vertically-laminated Li-ion battery cells, and that said method includes the following steps:
  a) coating a surface of a polyester film with a polyurethane adhesive, roller- or flat-pressing a metal foil and the pre-coated polyester film, thereby obtaining a polyester composite film covered with the metal foil on the surface;
  b) coating the polyester composite film covered with the metal foil with two kinds of slurries of a positive electrode active material and a gel polymer electrolyte by using a two-layer one-step coating process, thereby obtaining a three-layer structural composite layer of the polyester/metal foil composite film, the positive electrode active material and the gel polymer electrolyte;
  c) coating a polyester composite film covered with a metal foil with a Li battery negative electrode material slurry, thereby obtaining a two-layer structural composite layer of the polyester/metal foil composite film and the negative electrode material;
  d) laminating, and flat- or roller-pressing the composite layers obtained in steps b) and c), heating and curing, thereby obtaining a gel polymer Li-ion battery cell;
  e) welding the metal foils of positive electrode and negative electrode with metal lugs; and
  f) vacuum-packing the battery cells, thereby obtaining the gel polymer Li-ion battery.

2. The method of preparing the gel polymer Li-ion battery according to claim 1, characterized in that the said gel polymer electrolyte in step b) consists of at least one polymeric monomer, at least one aldehydic curing agent and a gel polymer electrolytic solution.

3. The method of preparing the gel polymer Li-ion battery according to claim 2, characterized in that the polymeric monomer is a polyurethane monomer.

4. The method of preparing the gel polymer Li-ion battery according to claim 2, characterized in that the aldehydic curing agent is a formaldehyde curing agent.

5. The method of preparing the gel polymer Li-ion battery according to claim 2, characterized in that the gel polymer electrolyte consists of 3-20% (w/w) of the polyurethane monomer, 0.1-5% (w/w) of the aldehydic curing agent and the gel electrolytic solution.

6. The method of preparing the gel polymer Li-ion battery according to claim 2, characterized in that the gel electrolytic solution is used in an amount of 75%-96.9% of the total mass of the gel polymer electrolyte.

7. The method of preparing the gel polymer Li-ion battery according to claim 2, characterized in that the composition of the gel electrolytic solution is the following: the solvent thereof is one selected from EC, PC, DMC, EMC and DME or the mixture thereof, and the solute thereof is one or two selected from $LiPF_6$ and $LiClO_4$; and the curing temperature of the gel polymer electrolyte is 20-100° C., and the curing duration is 10-240 minutes.

8. The method of preparing the gel polymer Li-ion battery according to claim 1, characterized in that the said negative electrode material slurry in step c) comprises at least one polyurethane adhesive, and further comprises one or more selected from mesocarbon spheres, nanographite, carbon nanotubes, and pyrolytic carbon spheres.

9. The method of preparing the gel polymer Li-ion battery according to claim 8, characterized in that the particle sizes of the nanographite, carbon nanotubes, and pyrolytic carbon spheres are 50-800 nm.

10. The method of preparing the gel polymer Li-ion battery according to claim 1, characterized in that groups of battery cells are laminated horizontally, thereby obtaining a gel polymer Li-ion battery pack comprising the plural groups of the gel polymer Li-ion battery cells.

11. The method of preparing the gel polymer Li-ion battery according to claim 10, characterized in that, when each of the group of gel polymer Li-ion battery cells for the lamination has the same geometrical shape, the deviations of the surface area, internal resistance and capacity among the groups are less than 3%.

12. The method of preparing the gel polymer Li-ion battery according to claim 1, characterized in that the thickness of the three-layer structural composite layer is 15-300 μm.

13. The method of preparing the gel polymer Li-ion battery according to claim 1, characterized in that the thickness of the two-layer structural composite layer in the step c) is 8-300 μm.

14. The method of preparing the gel polymer Li-ion battery according to claim 1, characterized in that the leading-out direction of the lugs in the step e) is horizontally at the same side or both sides of the battery cell.

* * * * *